US010997087B2

(12) United States Patent
Cloute

(10) Patent No.: US 10,997,087 B2

(45) Date of Patent: May 4, 2021

(54) DIRECT MEMORY ACCESS

(71) Applicant: STMicroelectronics (Grenoble 2) SAS, Grenoble (FR)

(72) Inventor: François Cloute, Coublevie (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 16/511,362

(22) Filed: Jul. 15, 2019

(65) Prior Publication Data

US 2020/0026662 A1 Jan. 23, 2020

(30) Foreign Application Priority Data

Jul. 19, 2018 (FR) ....................................... 1856705

(51) Int. Cl.

*G06F 12/1081* (2016.01)
*G06F 3/06* (2006.01)

(52) U.S. Cl.

CPC ........ *G06F 12/1081* (2013.01); *G06F 3/0604* (2013.01); *G06F 3/0655* (2013.01); *G06F 3/0679* (2013.01); *G06F 2212/621* (2013.01)

(58) Field of Classification Search

CPC .. G06F 12/1081; G06F 3/0604; G06F 3/0655; G06F 3/0679; G06F 2212/621

USPC .......................................................... 711/154

See application file for complete search history.

(56) References Cited

U.S. PATENT DOCUMENTS

| | | | |
|---|---|---|---|
| 5,781,199 A * | 7/1998 | Oniki | G06F 15/8007 345/505 |
| 6,782,465 B1 * | 8/2004 | Schmidt | G06F 13/28 710/22 |
| 2006/0050693 A1 | 3/2006 | Bury et al. | |
| 2006/0259657 A1 * | 11/2006 | Sachs | G06F 13/28 710/22 |
| 2011/0219152 A1 * | 9/2011 | Kawata | G06F 13/28 710/35 |
| 2015/0186068 A1 * | 7/2015 | Benisty | G06F 3/061 711/154 |
| 2018/0365181 A1 * | 12/2018 | Cottam | G06F 13/28 |

FOREIGN PATENT DOCUMENTS

WO 0129656 A2 4/2001

OTHER PUBLICATIONS

NXP Semiconductors, "QorlQ LS1021A Reference Manual", Supports LS1020A and LS1022A, Document No. LS1021ARM, Rev. 1, Jun. 2016, 3251 pages.

* cited by examiner

*Primary Examiner* — Gautam Sain

(74) *Attorney, Agent, or Firm* — Slater Matsil, LLP

(57) ABSTRACT

A system includes a direct memory access controller and a memory coupled to the direct memory access controller. The memory stores a linked list of records. Each record contains a first field determining the number of fields of a next record. For example, each record can be representative of parameters of execution of a data transfer by the direct memory access controller.

20 Claims, 4 Drawing Sheets

DIRECT MEMORY ACCESS

CROSS-REFERENCE TO RELATED APPLICATIONS

This application claims priority to French Patent Application No. 1856705, filed on Jul. 19, 2018, which application is hereby incorporated herein by reference. U.S. patent application Ser. No. 16/516,988, filed Jul. 19, 2019 also claims priority to French Patent Application No. 1856705.

TECHNICAL FIELD

The present disclosure generally concerns electronic systems and, in particular embodiments to electronic systems utilizing direct memory access.

BACKGROUND

Direct memory access is a method enabling, in an electronic system, to transfer data between a peripheral and a memory, between two peripherals, or between two memories with no intervention of a central processing unit (CPU), except to start and end the transfer.

Direct memory access is generally implemented by a direct memory access control circuit. To perform a data transfer, the circuit reads from a memory a record from a linked list of records ("Linked List Item"—LLI) to obtain the parameters of the transfer. The read parameters are temporarily stored in a register assembly, or register bank, of the circuit. The circuit then performs the transfer according to the stored parameters.

SUMMARY

An embodiment overcomes at least certain disadvantages of known electronic systems.

An embodiment overcomes at least certain disadvantages of electronic circuits where a task is parameterized by registers programmed from a linked list of records stored in a memory.

An embodiment overcomes at least certain disadvantages of electronic systems where the task parameterized by the registers is a data transfer by direct memory access.

Thus, according to a first aspect, an embodiment provides a memory containing at least one linked list of records, each record containing a first field determining the number of fields of the next record.

According to an embodiment, each field of a record is representative of a content to be programmed in a register of a register bank.

According to an embodiment, the first field determines in which registers the contents should be programmed.

According to an embodiment, the first field comprises bits, each of which identifies a register, the values of the bits determining the fields of the record to be programmed.

According to an embodiment, each record is representative of parameters of execution of a task.

According to an embodiment, the task is a data transfer by a direct memory access control circuit.

According to an embodiment, for each record representative of a data transfer, the parameters of execution of the transfer comprise a transfer start condition and a transfer end event.

According to an embodiment, for each record, the parameters of execution of the transfer further comprise an indication of at least one time at which the condition should be detected and of at least one time at which the event should be generated.

According to an embodiment, the memory contains a first and a second linked lists of records, the start condition of a record of the first list corresponding to a detection of the event of a record of the second list.

According to an embodiment, the memory is of SRAM type.

According to the first aspect, an embodiment provides a method comprising successive updates of a bank of registers from a linked list of records contained in a memory such as previously defined.

According to an embodiment, each record determines one of the successive updates.

According to an embodiment, the method comprises, reading the register programmed from the first field of a current record and deducing therefrom, for each register, whether the next record comprises a field from which the register should be programmed during the next programming of the register bank. During the next programming of the register bank, the corresponding register is programmed in the register bank based on each field of the next record.

According to the first aspect, an embodiment provides an electronic system comprising a memory such as previously defined, and a circuit provided with a register bank, the circuit being configured to implement the previously defined method.

According to an embodiment, the circuit is a direct memory access controller.

According to a second aspect, an embodiment provides a memory containing at least one linked list of records, each record being representative of parameters of a data transfer by a direct memory access control circuit, the parameters comprising a transfer start condition and a transfer end event.

According to an embodiment, for each record, the parameters further comprise an indication of at least one time at which the condition should be detected and of at least one time at which the event should be generated.

According to an embodiment, the memory contains a first and a second linked lists of records, the start condition of a record of the first list corresponding to a detection of the end event of a record of the second list.

According to an embodiment, each record contains a first field determining the number of fields of the next record.

According to an embodiment, each field of a record is representative of a content to be programmed in a register of a register bank.

According to an embodiment, the first field determines in which registers the contents should be programmed.

According to an embodiment, the first field comprises bits, each of which identifies a register, the values of the bits determining the fields of the record to be programmed.

According to an embodiment, the first record in the list contains as many fields as there are registers.

According to an embodiment, the memory is of SRAM type.

According to the second aspect, an embodiment provides a method of data transfer by direct memory access wherein first transfers are performed over a first channel of a direct memory access control circuit and second transfers are performed over a second channel of the circuit, each first transfer being parameterized by a corresponding record of a first list of a memory such as previously defined.

According to an embodiment, each record of the first list corresponds to an update of a first register bank associated with the first channel, and each record of the second list corresponds to an update of a second register bank associated with the second channel.

According to an embodiment, a current content of each register bank parameterizes a corresponding transfer over the channel having the register bank associated therewith.

According to an embodiment, for each record, the corresponding transfer only starts if the start condition of the record is detected.

According to the second aspect, an embodiment provides an electronic system comprising a memory such as previously defined, and a direct memory access control circuit provided with a plurality of channels, each of which is associated with a register bank, the circuit being configured to implement the method such as previously defined.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
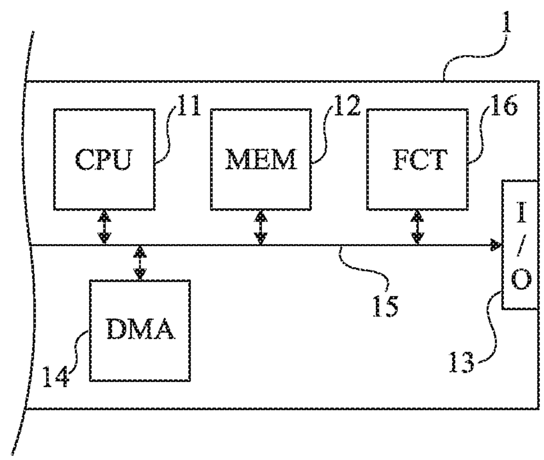
FIG. 1 very schematically shows in the form of blocks an embodiment of an electronic circuit 1 of the type to which the embodiments which will be described apply as an example.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the various parameters currently used for data transfers by direct memory access have not been detailed, the described embodiments being compatible with such usual parameters. Further, the various electronic systems having a direct memory access controller provided therein have not been detailed, the described embodiments being compatible with most of such usual electronic systems.

FIG. 1 very schematically shows, in the form of blocks, an embodiment of an electronic circuit or system 1 of the type to which the embodiments which will be described apply as an example.

Electronic system 1 comprises a central processing unit 11 (CPU), for example, a state machine, a microprocessor, a programmable logic circuit, on. The system 1 also includes one or a plurality of memories, among which at least one RAM 12 (MEM), for example, of SRAM type, at least one input/output interface 13 (I/O) of communication, for example, of series bus type, with the outside of system 1, a direct memory access control circuit 14 (DMA), and one or a plurality of data, address, and/or control buses between the different elements internal to system 1, here shown in the form of a single bus 15.

Further, system 1 may integrate other functions, symbolized by a block 16 (FCT), according to the application, for example, a processor dedicated to image processing, other interfaces, other memories, etc.

System 1 is configured to execute various applications such as image processing, video coding, and/or decoding, processing of data originating from a sensor, etc. Such applications require data transfers, via bus 15, between elements internal to system 1. To fluidize the operation of system 1 and to decrease the load of central processing unit 11, such data transfers are performed by direct memory access, under control of circuit 14. In this embodiment, circuit 14 comprises a plurality of data transfer channels. Each channel of circuit 14 enables to perform data transfers between two elements (circuit and/or memory) of system 1. Each channel is associated with a register bank storing, for each data transfer over the channel, the parameters of the transfer.

When an application has to be executed by system 1, central processing unit 11 configures circuit 14 so that circuit 14 reserves one of these channels for the application. All the data transfers of the application are then performed via the channel reserved for the application. In the described embodiments, the source element and/or the destination element of the data to be transferred may change during the execution of the application.

Figure 2:
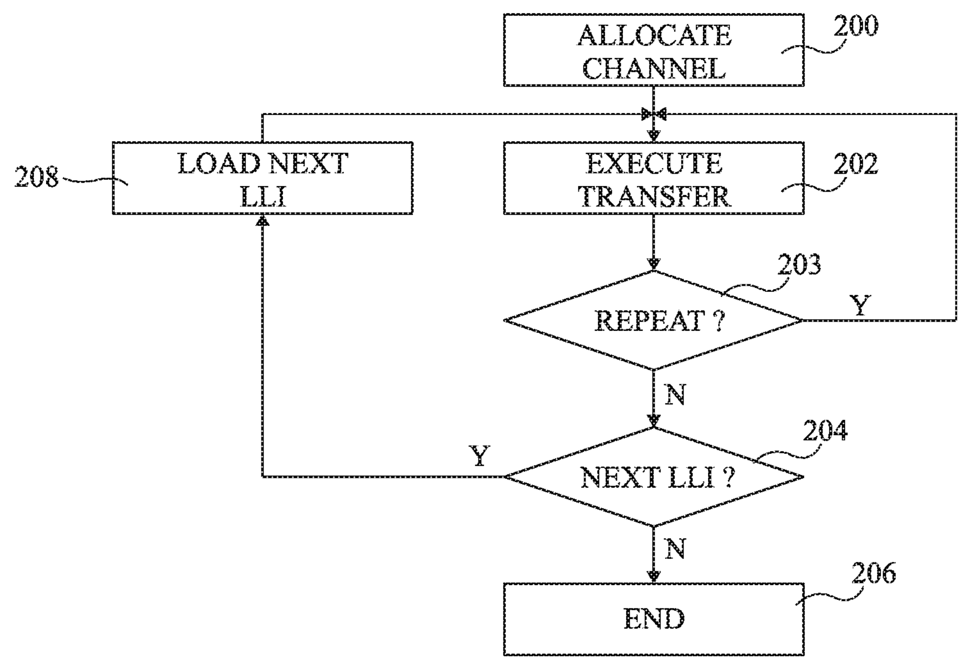
FIG. 2 is a flowchart illustrating in the form of blocks an embodiment of a method of data transfer by direct memory access.

FIG. 2 is a flowchart illustrating, in the form of blocks, an embodiment of a method of data transfer by direct memory access. More particularly, FIG. 2 illustrates, for a given application, a method of successive updates of a register bank associated with a channel of circuit 14 of FIG. 1, based on a linked list of records representative of the data transfers of the application.

At an initial step 200 (ALLOCATE CHANNEL), a channel is allocated to an application by programming the register bank associated with this channel with the parameters of a first data transfer of this application. This step amounts to indicating to circuit 14 which linked list of records it should use to parameterize the transfers which are to take place over the channel. Each record in the list determines the memory address of the next record. Each record further determines the parameters of a corresponding data transfer, for example, the indication that the transfer concerns data or data blocks, the start address of an address range of a source where the data or the data blocks to be transferred are stored, the start address of an address range of a destination where the transferred data or data blocks should be copied, the number of data or of data blocks to be transferred, the size of the data, the number of data per blocks, address shifts between two successive data or between two successive blocks to be transferred, etc. Each record may thus correspond to the transfer of a piece of data, of a plurality of data, of a data block or of a plurality of blocks between a source and a destination.

According to an embodiment, at step 200, the register bank is programmed by reading from memory 12, at a memory address supplied by central processing unit 11, the first record in a list and by programming the register bank based on this record.

According to another embodiment, at step 200, the register bank is directly programmed, with no reading of a record from memory 12, for example, on initialization of system 1 or by central processing unit 11. In particular, the address of the first record in a list is then programmed in the register bank.

Once the register bank has been programmed to allocate the channel to the application, central processing unit 11 indicates to circuit 14 that it can start executing the data transfers of the application.

At a next step 202 (EXECUTE TRANSFER), circuit 14 performs, on the channel reserved for the application, the data transfer parameterized by the content of the register bank of the channel, it being understood that such a transfer may concern a plurality of data or a plurality of data blocks.

A test 203 (REPEAT?) is then performed to determine, from the content of the register bank, whether the data transfer executed at the previous step 202, and having its parameters stored in the register bank, should or not be repeated.

If the transfer has to be repeated (output Y of block 203), the method carries on at step 202. It can thus be understood that, since the content of the register bank is then not modified, the transfer is then executed in a loop.

If this last transfer does not have to be repeated (output N of block 203), the method carries on with a test 204 (NEXT LLI?). This test determines, based on the current content of the register bank, whether there is a next record in the list, in other words whether there remains at least one transfer to be performed for the application.

If there is no next record in the list (output N of block 204), test 204 is followed by a step 206 (END) where the channel is freed and can thus be allocated to a new application.

If there is a next record (output Y of block 204), test 204 is followed by a step 208 (LOAD NEXT LLI) where the next record is read from memory 12 by circuit 14 and the register bank is updated with the parameters of the next data transfer of the application. The method then carries on at step 202.

It should be noted that the order and/or the number of the steps of the method of FIG. 2 may be modified. In particular, tests 203 and 204 may be performed simultaneously.

As an example, the case where the transfers which should occur over a channel are not performed at the data block level, but only at the data level, is considered in the rest of the disclosure. It is also considered that when a transfer corresponds to the transfer of a plurality of data, the data are stored one after the others in a source address range and copied one after the others into a destination address range.

Figure 3:
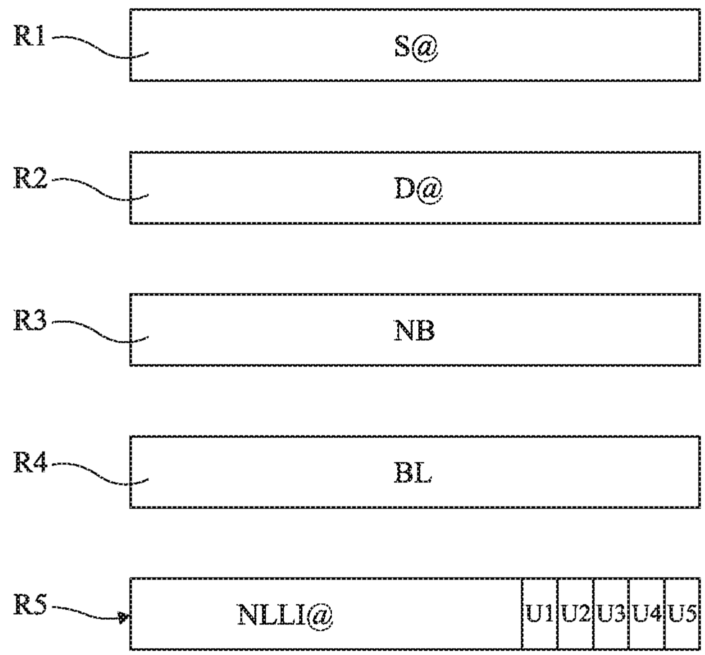
FIG. 3 schematically shows in the form of blocks an embodiment of a register bank of a direct memory access control circuit.

FIG. 3 schematically shows in the form of blocks an embodiment of a register bank associated with a data transfer channel of circuit 14.

In this example, the register bank comprises five registers R1, R2, R3, R4, and R5 enabling to temporarily store the parameters of a data transfer. Registers R1, R2, R3, R4, and R5 are here intended to respectively store start address S@ of a source of the data to be transferred, start address D@ of an address range of a destination of the data to be transferred, number NB of data to be transferred, size BL of the data to be transferred, and address NLLI@ of the next record in memory 12. In the rest of the disclosure, linked list register or LLR register designates the register intended to store the information relative to the linked list of records, and in particular address NLLI@. Preferably, the LLR register is the last register in the register bank, in this example, register R5.

In this embodiment, one of the registers, preferably, the LLR register, is also intended to store information relative to the next record in the list. Such information determines the number of fields of the next record in the list. Each field of a record is for example representative of a content to be programmed in a corresponding register, at the next update of the register bank. Preferably, each field is directly copied into a corresponding register during the update. The information relative to the next record in the list further determines to which register each field of the next record is allocated. Such information is stored by bits of LLR register R5, for example, five bits U1, U2, U3, U4, and U5. In this embodiment, bits U1, U2, U3, U4, and U5 are respectively allocated to registers R1, R2, R3, R4, and R5, the value of each bit U1, U2, U3, U4, U5 determining whether the next record comprises a field representative of a content to be programmed in the register, respectively R1, R2, R3, R4, R5. For example, if bit U1 is at a first binary value, for example '1', the next record comprises a field representative of a content to be programmed in register R1, and if the bit is at the second binary value, for example '0', the next record comprises no such field.

As an example, test 203 described in relation with FIG. 2 comprises verifying whether all bits U1 to U5 are at '0' and whether address @NLLI is not null. If this is true, this means that the register bank does not have to be updated and that the last executed transfer should be repeated.

Still as an example, test 204 described in relation with FIG. 2 comprises verifying whether address @NLLI is null. If this is true, this means that there is no next record and that all the transfers of the application have been performed.

It should be noted that the information relative to the number of fields of the next record and to the register to which each of these fields is allocated, the indication according to which a transfer should be repeated and/or the indication according to which the list contains no next record, may be represented in a form different from that described hereinabove as an example.

Figure 4:
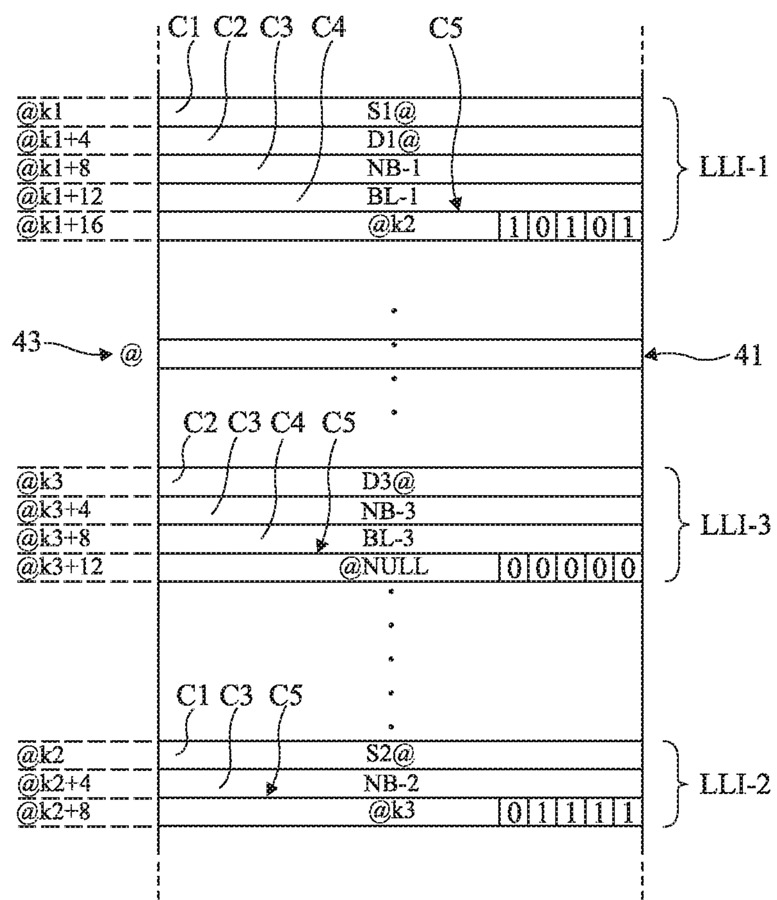
FIG. 4 schematically shows a memory containing an embodiment of a linked list of records to program the registers of FIG. 3.
Figure 5:
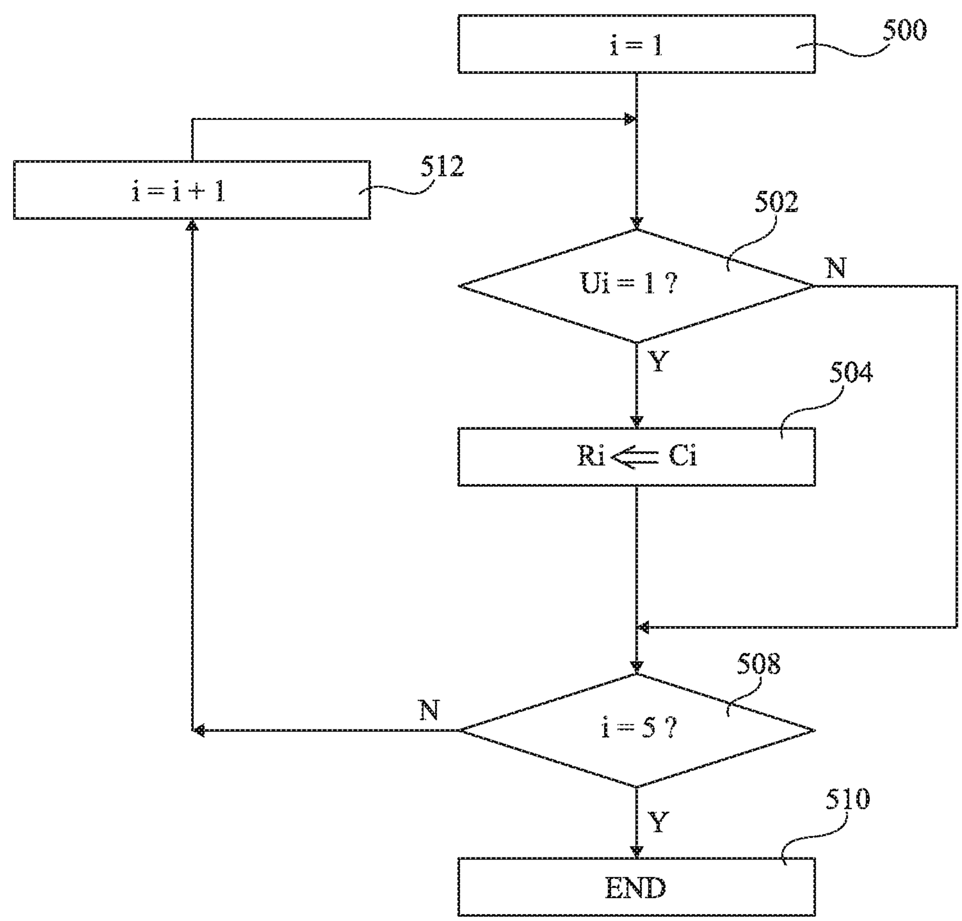
FIG. 5 is a flowchart illustrating in further detail an embodiment of a step of the method of FIG. 2.

FIG. 4 schematically shows a memory, for example, memory 12 of FIG. 1, containing an embodiment of a linked list of records for programming the registers of FIG. 3.

Memory 12 is divided into a plurality of memory words 41 of fixed size, for example, 4 bytes, each being associated with a memory address 43. Memory 12 contains a linked list of records formed, in this example, of three records LLI-1, LLI-2, and LLI-3. The fields of a same record are recorded one after the others in memory 12, here from the memory address of the first field of this record. In this example, each field occupies a memory word 41. As a variation, each field may require more than one memory word for its memory storage or a memory word may contain more than one field. Preferably, the fields of each record follow one another in the same order as the corresponding registers of the register bank. In this example, the memory address of a record corresponds to the address at which the first field of this record is recorded.

In this example, the case where, at step 200 of FIG. 2, the register bank is programmed from first record LLI-1 in the list is considered. As illustrated in FIG. 4, first record LLI-1 then comprises as many fields as there are registers, five in the present example, so that each register can be programmed with a field of the record. More particularly, record LLI-1 comprises successive fields C1, C2, C3, C4, and C5 representative of a content to be programmed in the registers, respectively R1, R2, R3, R4, and R5. In this example, fields C1, C2, C3, and C4 of record LLI-1 are respectively representative of an address S1@, of an address Di@, of a number NB-1, and of a size BL-1. Field C5 of the record is representative of address @k2 of the next record LLI-2 in memory 12, and of information relative to this next record LLI-2. In this example, the information relative to the next record is in the form of five bits of values '1', '0', '1', '0', and '1' respectively corresponding to bits U1, U2, U3, U4, and U5 of register R5. In this example, first field C1 of record LLI-1 is recorded in address memory word @k1 and the next fields C2, C3, C4, and C5 are recorded in the next memory words of respective addresses @k1+4, @k1+8, @k1+12, and @k1+16, each memory word here occupying four bytes.

Second record LLI-2 comprises successive fields C1, C3, and C5 representative of a content to be programmed in the registers, respectively, R1, R3, and R5. Fields C1 and C2 are respectively representative of an address S2@ and of a number NB-2, field C5 being representative of address @k3 of the next record LLI-3 and of five bits of values '0', '1', '1', '1', and '1' respectively corresponding to bits U1, U2, U3, U4, and U5 of register R5. In this example, first field C1 of record LLI-2 is recorded in address memory word @k2 and the next fields C3 and C5 are recorded in the next memory words of respective addresses @k2+4 and @k2+8.

Third record LLI-3 comprises successive fields C2, C3, C4, and C5 representative of a content to be programmed in the registers, respectively R2, R3, R4, and R5. Fields C2, C3, and C4 are respectively representative of an address D3@, of a number NB-3, and of a size BL-3. In the shown example, field C5 is representative of a null address @NULL and of five bits U1 to U5 of value '0', which indicates that record LLI-3 is the last one in the list and that the transfer corresponding to this record does not have to be repeated. In this example, first field C2 of record LLI-3 is recorded in address memory word @k3 and the next fields C3, C4, and C5 are recorded in the next memory words of respective addresses @k3+4, @k3+8, and @k3+12.

In the above-described list, at least certain records stored in the memory contain a number of fields smaller than the number of registers of the register bank updated from these records. Thus, the storage capacity of memory 12 may be decreased with respect to that of a memory where each record of a linked list would have as many fields as there are registers in the register bank. The decrease in the storage capacity of memory 12 causes a decrease in its surface area and in its static power consumption.

FIG. 8 illustrates, in the form of a flowchart, step 208 of the method of FIG. 2 described hereinabove, that is, the updating of a register bank based on a record of a linked list of records stored in the memory.

At an initialization step 500 (i=1), a loop variable i, i being an integer, is initialized, to 1 in the present example.

At a next test step 502 (U1=1?), circuit 14 tests the current value of bit Ui of LLR register R5 to determine whether the next record contains a field Ci representative of a content to be programmed in register Ri.

If, during step 502, the current value of bit Ui of LLR register R5 is '1' (output Y of block 502), this means that the next record comprises a field Ci representative of a content to be programmed in register Ri. The test is then followed by a step 504 (Ri<=Ci) of programming register Ri with this content. Step 504 is followed by a test 508 (i=5?) during which it is verified whether the current value of each bit Ui of register R5 has been tested. If so (output Y of block 508), the update of the register bank based on the next record is finished (block END, 510). Otherwise (output N of block 508), the method carries on at a step 512 (i=i+1) where variable i is incremented, after which the method loops back onto step 502.

If, during step 502, the current value of bit Ui of LLR register R5 is '0' (output N of block 502), this means that the next record does not comprise a field Ci representative of a content to be programmed in register Ri. The method then directly carries on to step 508 and the content of register Ri is left unchanged.

The above-described method enables, when the register bank associated with a channel is updated from a record of a linked list of the type described in FIG. 4, to only update certain registers in the register bank, preferably only the registers having a content which is modified between two successive transfers. This results in a decrease in the number of accesses to memory 12 with respect to the case where all the registers in the bank would be updated. Such a decrease in the number of accesses to memory 12 causes a decrease in the dynamic power consumption of memory 12, and more generally of system 1 of FIG. 1. Advantage is here taken from the fact that two successive data transfers over a channel reserved for an application generally have certain identical parameters.

It should be noted that the order and/or the number of the steps of the above method may be modified. For example, all bits Ui may first be read, after which all the updates of the registers are performed according to the values of the read bits.

Further, the embodiments described in relation with FIGS. 1 to 5 apply to register banks of other circuits than a direct memory access controller to parameterize the execution of a task by this circuit.

In the above-described embodiments, as is generally the case in a direct memory access control circuit, once a channel has been allocated to an application (step 200, FIG. 2) and central processing unit 11 has authorized circuit 14 to execute the transfers of this application, circuit 14 performs all these transfers autonomously, with no intervention of central processing unit 11. Once all the transfers have been performed, circuit 14 notifies central processing unit 11, which can then allocate this channel to another application. Thus, a synchronization between two applications, executed on two different channels of circuit 14, can only be performed by central processing unit 11, either at the beginning of the execution of one of the two applications, or at the end of the execution of one of the two applications, when all the records corresponding to the data transfers of this application have been read and the corresponding transfers have been performed.

Figure 6:
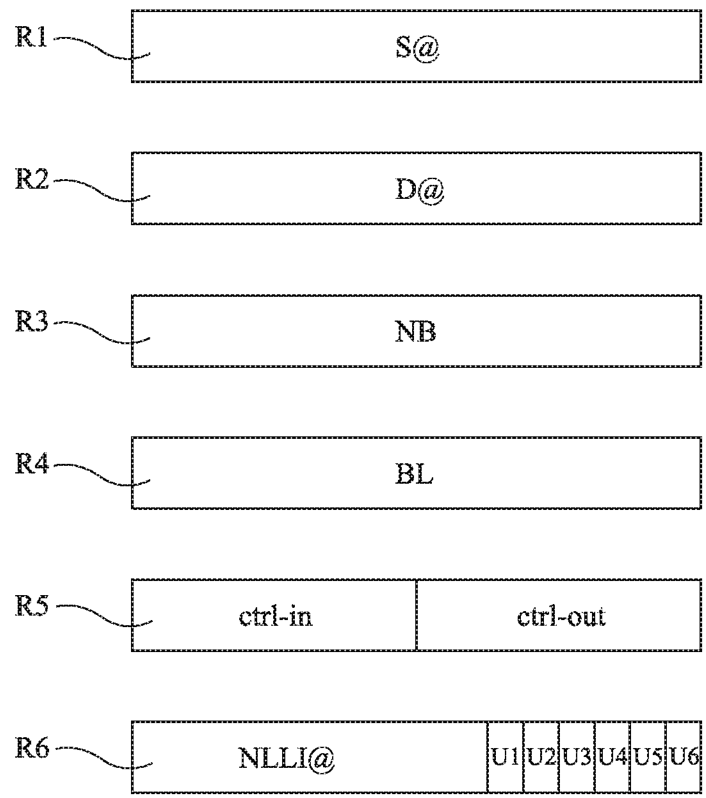
FIG. 6 schematically illustrates in the form of blocks another embodiment of a register bank of a direct memory access control circuit.

FIG. 6 schematically shows in the form of blocks an example of another embodiment of a register bank of a data transfer channel of circuit 14.

The register bank of FIG. 6 here comprises six registers R1, R2, R3, R4, R5, and R6, registers R1, R2, R3, and R4 of FIG. 6 being, in this example, similar to registers R1, R2, R3, and R4 of FIG. 3. Register R5 is here intended to store a transfer start condition ctrl-in and a transfer end event ctrl-out. Register R6 forms the linked list register (LLR) of the register bank and is, as in FIG. 3, intended to store address NLLI@ of a next record and the information relative to this next record, particularly the number of fields of the record and to which register each field of the next record is allocated. Such information is here stored in the form of six bits U1, U2, U3, U4, U5, and U6 respectively associated with registers R1, R2, R3, R4, R5, and R6.

The updating of the register bank of FIG. 6 from a record of a linked list of records is performed similarly to what has been described in relation with FIGS. 1 to 5, the records in the list being accordingly adapted. In particular, each record may comprise an additional field C6 (not illustrated) representative of content to be programmed in register R6. Further, for each record, field C6 of the record may then comprise six bits corresponding to the six bits U1 to U6 of register R6.

In an alternative embodiment, condition ctrl-in and event ctrl-out are stored in one of registers R1 to R4 and R6, and condition ctrl-in may be stored in another register than that storing event ctrl-out. Such a variation is for example implemented when one or a plurality of registers R1 to R4 and R6 contain unused bits then enabling to store information ctrl-in and ctrl-out. This enables to suppress register R5, LLR register R6 being then given number R5.

Figure 7:
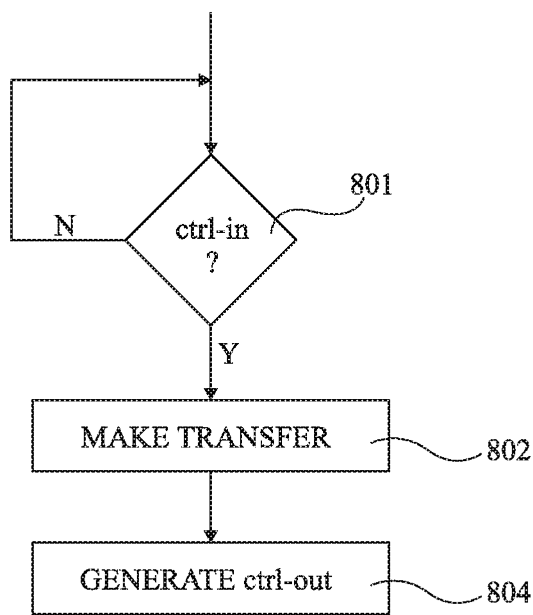
FIG. 7 is a flowchart illustrating an embodiment of a method of data transfer by direct memory access.

FIG. 7 is a flowchart illustrating an embodiment of a data transfer by direct memory access. More particularly, FIG. 7 illustrates in further detail step 202 of the method of FIG. 2.

At a step 801 (ctrl-in?) implemented by circuit 14, all the parameters of the data transfer to be executed are stored in the registers of the register bank. Step 801 comprises detecting transfer start condition ctrl-in, stored in register R5 in the present example. Step 801 is repeated (output N of block 801) as long as condition ctrl-in has not been detected. When condition ctrl-in is detected (output Y of block 801), the method carries on with a step 802 (MAKE TRANSFER) during which the data transfer parameterized by the content of the register bank is performed and then, once the transfer is finished, with a step 804 (GENERATE ctrl-out) during which event ctrl-out is generated by circuit 14.

In this embodiment, when an event ctrl-out is generated at the end of a first data transfer over a first channel reserved to a first application, and condition ctrl-in of beginning of a second transfer over a second channel reserved to a second application corresponds to the detection of event ctrl-out, the second transfer can only start after the generation of event ctrl-out of the first transfer. Thus, the first and second transfers, and thus the first and second applications, may be synchronized with respect to each other, directly at the level of circuit 14, with no intervention of central processing unit 11, and while these applications are being executed. More generally, the provision of a condition ctrl-in and of an event ctrl-out for at least certain data transfers of a plurality of applications executed by system 1 enables to synchronize these applications together, without using the central processing unit, which may be set to stand-by, or even turned off, during the execution of these applications.

In an alternative embodiment, not shown, an additional parameter indicating at what time condition ctrl-in should be detected during a transfer of a plurality of data, for example, before the transfer of the first piece of data or before the transfer of each piece of data, is provided. Similarly, an additional parameter indicating at what time event ctrl-out should be generated on transfer of a plurality of data, for example, after the transfer of the last piece of data or after the transfer of each piece of data, is provided. The registers and the records in the list are then adapted to integrate these additional parameters. The method of FIG. 7 is also accordingly adapted. For example, during a transfer of a plurality of data, if condition ctrl-in is detected before each data transfer and event ctrl-out is generated after each data transfer, steps 801, 802, and 804 are implemented for each transferred piece of data, step 802 then corresponding to the data transfer.

The provision of one or a plurality of additional parameters to indicate the time(s) of a transfer at which a condition ctrl-in should be detected and the time(s) at which an event ctrl-out should be generated enables to control the granularity with which the synchronization is performed between applications executed in parallel by system 1.

It should be noted that condition ctrl-in of a transfer over a channel may correspond to the detection of an event other than an event ctrl-out generated during a transfer over another channel, for example, to an interruption generated in system 1.

As an example, each condition ctrl-in may correspond to the detection of a level change, for example, the passing from a high level to a low level or conversely, of a signal corresponding to this condition. Each event ctrl-out for example comprises changing the level of a signal corresponding to this event.

It should be noted that the embodiment of FIGS. 6 and 7 may be implemented without bits U1 to U6. In this case, since there is no conditional update of the registers, each record in the linked list contains as many fields as there are registers.

In alternative embodiments, not shown, the registers and the records described in relation with FIGS. 3 to 7 may integrate one or a plurality of additional parameters to manage transfers by data blocks and/or, in a source and/or destination address range, address shifts between two successive pieces of data or two successive data blocks to be transferred.

Further, in the case where the registers and the records are capable of managing transfers by data blocks, it may be provided that, during a transfer of a plurality of data blocks, condition ctrl-in is detected before the transfer of each block and/or event ctrl-out is generated after the transfer of each block. The parameter(s) indicating at which times condition ctrl-in should be detected and/or event ctrl-out should be generated will then be adapted accordingly, as well as the method described in relation with FIG. 7.

Specific embodiments have been described. Those skilled in the art may combine various elements of these various embodiments and variations without showing any inventive step. Further, various alterations and modifications will occur to those skilled in the art. In particular, the number of registers, the number of parameters stored by the register bank, and/or the number of parameters stored by each register, may vary.

Further, other parameters may be provided. For example, in the case of a data transfer by direct memory access, a parameter may indicate whether the data and/or the data blocks of the transfer corresponding to a record should be transferred one by one or in bursts.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A system comprising:

a direct memory access controller; and a memory coupled to the direct memory access controller, the memory storing a linked list of records, each record comprising a plurality of fields including a first field, wherein the first field of each record comprises a sequence of bits, each of which corresponds to a field of the plurality of fields of a next record in a one-to-one ratio, and wherein each field of each record is representative of content to be programmed in a corresponding register of a register bank.

2. The system of claim 1, wherein the first field of each record indicates which registers of the register bank are programmed based on values of the sequence of bits of the respective record that correspond to the plurality of fields of the next record during an update of the register bank based on the next record.

3. The system of claim 1, wherein the first field indicates in which registers the content should be programmed.

4. The system of claim 1, wherein each record is representative of parameters of execution of a task.

5. The system of claim 4, wherein the task is a data transfer by the direct memory access controller.

6. The system of claim 5, wherein, for each record representative of a data transfer, the parameters of execution of the transfer comprise a transfer start condition and a transfer end event.

7. The system of claim 6, wherein, for each record, the parameters of execution of the transfer further comprise an indication of a time at which the condition should be detected and of a time at which the event should be generated.

8. The system of claim 6, wherein the memory contains a first linked list of records and a second linked list of records, the start condition of a record of the first list corresponding to a detection of the event of a record of the second list.

9. The system of claim 1, the memory comprises a static random access memory (SRAM).

10. The system of claim 1, wherein the register bank comprises a linked list register configured to store both an address of the next record and the sequence of bits corresponding to the plurality of fields of the next record.

11. A system comprising:

a central processing unit;

a direct memory access controller coupled to the central processing unit via a bus;

a plurality of registers associated with the direct memory access controller; and a memory coupled to the direct memory access controller, the memory storing a linked list of records, each record comprising a plurality of fields including a first field, wherein the first field of each record comprises a sequence of bits, each of which corresponds to a field of the plurality of fields of a next record in a one-to-one ratio, and wherein each record is representative of parameters of execution of a data transfer by the direct memory access controller.

12. The system of claim 11, wherein each field of a record is representative of a content to be programmed in a register of a register bank.

13. The system of claim 12, wherein the first field determines in which registers the content should be programmed.

14. The system of claim 12, wherein the sequence of bits comprises values determining the fields of the next record to be programmed during an update of the register bank based on the next record.

15. The system of claim 11, wherein, for each record representative of a data transfer, the parameters of execution of the transfer comprise a transfer start condition and a transfer end event.

16. The system of claim 15, wherein, for each record, the parameters of execution of the transfer further comprise an indication of a time at which the condition should be detected and of a time at which the event should be generated.

17. The system of claim 16, wherein the memory contains a first linked list of records and a second linked list of records, the start condition of a record of the first list corresponding to a detection of the event of a record of the second list.

18. A method comprising:

storing a linked list of records in a memory coupled to a direct memory access controller, each record comprising a plurality of fields including a first field, wherein the first field of each record comprises a sequence of bits, each of which corresponds to a field of the plurality of fields of a next record in a one-to-one ratio; and successively updating a register bank from the linked list of records based on values of the sequences of bits.

19. The method of claim 18, wherein each record determines one of the successive updates.

20. The method of claim 18, further comprising:

reading a register programmed from the first field of a current record;

for each register, deducing from the reading whether a next record comprises a field from which the register should be programmed during the next programming of the register bank; and during the next programming of the register bank, programming the corresponding register in the register bank based on each field of the next record.

* * * * *